United States Patent [19]

Czerwinski et al.

[11] Patent Number: 4,870,142

[45] Date of Patent: Sep. 26, 1989

[54] NOVEL URETHANE POLYMER ALLOYS WITH REACTIVE EPOXY FUNCTIONAL GROUPS

[75] Inventors: Richard W. Czerwinski, Nashville, Tenn.; Han X. Xiao, Detroit, Mich.

[73] Assignee: Genesco Inc., Nashville, Tenn.

[21] Appl. No.: 203,180

[22] Filed: Jun. 7, 1988

[51] Int. Cl.$^4$ ............................................. C08L 75/04
[52] U.S. Cl. ................................................... 525/528
[58] Field of Search ........................................ 525/528

[56] References Cited

U.S. PATENT DOCUMENTS

| 4,036,906 | 7/1977 | Finelli | 525/528 |
| 4,608,418 | 8/1986 | Czerwinski et al. | 528/80 |

Primary Examiner—Maurice J. Welsh
Attorney, Agent, or Firm—Sughrue, Mion, Zinn, Macpeak & Seas

[57] ABSTRACT

A thermoplastic polymer alloy comprising the reaction product of at least one polyisocyanate, at least one substantially linear polyhydroxyl compound, and/or at least one chain extender and at least one epoxy resin. Upon curing, a thermoset polymer alloy results which is cured through the epoxy functionality which is bound in the structure.

14 Claims, No Drawings

NOVEL URETHANE POLYMER ALLOYS WITH REACTIVE EPOXY FUNCTIONAL GROUPS

BACKGROUND OF THE INVENTION

1. Field of the Invention

The present invention relates to urethane polymer alloys with reactive epoxy groups.

2. Description of the Prior Art

U.S. Pat. No. 4,608,418 Czerwinski et al discloses thermoplastic hot melt compositions and processes for forming such compositions The compositions comprise a polyurethane having at least one plasticizer reacted therein formed by heating a reaction mixture comprising at least one isocyanate having a functionality of less than about 2 at least one long chain polyol, and at least one chain extender. At column 9 this patent indicates that if desired thermoplastic resins can be reacted with the components of the hot melt material and an example of a useful thermoplastic material is an epoxy resin. The materials of this patent cannot be thermoset as the materials of the present invention Japanese Kokai No. 59,240,611 discloses reactive hot-melt adhesives which comprises a thermoplastic polyurethane containing an epoxy side chain which is prepared by treating an epoxy resin with an isocyanate-terminated polyurethane prepolymer.

Japanese Kokai No. 59.172.576 discloses hot-melt adhesives prepared by treating a polyfunctional isocyanate with a polyester made from aromatic dicarboxylic acid(s), aliphatic dicarboxylic acid(s), aliphatic diols and a poly (oxyalkylene glycol).

French Demande FR No. 2,536,753 discloses an epoxy resin containing at least two OH groups reacted with a diol-polyisocyanate reaction product to give a melt-processable, thermosetting thermoplastic containing pendant epoxy groups which is applied to substrates as an adhesive and cured by heating to give strong joints.

U.S. Pat. No. 4,395,533 Bertram et al discloses epoxy resins prepared by reacting a hydroxybenzamide or derivative thereof with an epihalohydrin followed by dehydrohalogenation. These epoxy resins have crystalline melting points, self-cure at elevated temperatures and cure rapidly in the presence of usual epoxy resin curing agents. Also disclosed are hydrolyzed products of these epoxy resins and subsequent reactions with polyisocyanates.

SUMMARY OF THE INVENTION

The present invention provides a series of thermoplastic polymer alloys with reactive epoxy groups, whereby the same can be cured to yield a thermosetting polymer alloy.

The thermoplastic polymer alloys of the present invention are formed from a mixture of (1) one or more polyisocyanates, (2) one or more hydroxyl terminated polyols and/or one or more chain extenders and (3) one or more epoxy resins.

The major object of the present invention is to provide thermoplastic polymer alloys which function, inter alia, as a hot melt composition.

Another major object of the present invention is to provide thermoplastic polymer alloys which exhibit the improved properties later described.

DESCRIPTION OF THE PREFERRED EMBODIMENTS

The thermoplastic polymer alloys of the present invention can be viewed as a hot melt polyurethane polymer which contains epoxy groups which can further react or cure to provide a thermosetting material. The thermoplastic polymer alloys of the present invention thus involve a polyurethane matrix having reacted therein an epoxy resin.

The thermoplastic polymer alloys of the present invention provide the ease of application of a thermoplastic material with all the benefits of a thermosetting material after crosslinking or curing.

It was quite surprising, given the reactivity of isocyanate groups and epoxy groups that, in accordance with the present invention, epoxy groups would remain reactive even after the formation of the product of the present invention.

It was thus quite surprising to us that epoxy resins could be reacted into the thermoplastic polymer alloys of the present invention and still obtain an initially thermoplastic polymer material.

A further quite surprising aspect of the present invention is that at the temperatures used to react the epoxy resin in the thermoplastic polymer alloy the resulting product is still curable: based on our background knowledge in the art, we had fully expected that the initial product would be thermoset due to the high reactivity of epoxy groups and isocyanate groups.

The "urethane" materials of the present invention are based on essentially stoichiometric amounts of a polyisocyanate (which will insure an initially thermoplastic material results) having a functionality of 2.2 or less, most preferably 2.15 or less, and most preferably in the range of 2.0–2.1. If the functionality is in excess of 2.2, a thermosetting material initially results. With certain isocyanates having a functionality close to 2.2 a thermosetting material can also initially result. Such are also excluded from the present invention. Basically, it requires at least a difunctional isocyanate for purposes of the present invention to form a polymer.

The most important aspect with respect to the polyisocyanates of the present invention is the functionality thereof. Accordingly, while we prefer to use 4,4-diphenylmethane diisocyanate (MDI), the present invention is, in our belief, of broad application with respect to the polyisocyanates selected.

The polyisocyanate reactants useful in our invention are aromatic, aliphatic, cycloaliphatic or aralkyl polyisocyanates containing from about 6 to 100 carbon atoms. Although the preferred isocyanate-containing reactants contain two isocyanate groups, reactants containing more than two such groups are operative so long as the average functionality does not exceed 2.2 and the resulting urethane is thermoplastic. Blends or mixtures are also included in our general definition of polyisocyanate. Isocyanate terminated prepolymers which perform as polyisocyanates under the conditions encountered in the process of our invention and have an average functionality of 2.2 or less are also useful and are considered equivalents to the polyisocyanates in our invention.

The following, among other polyisocyanates, are expected to be useful:
toluene-2,4-diisocyanate;
3-phenyl-2-ethylenediisocyanate;
1,5-naphthalene diisocyanate;

cumene-2,4-diisocyanate;
4-methoxy-1,3-phenylene diisocyanate;
3-chloro-1,3-phenylenediisocyanate
4-bromo-1,3-phenylene diisocyanate;
4-ethyloxy-1,3-phenylenediisocyanate;
2,4'-diisocyanatodiphenyl ether;
5,6-dimethyl-1,3-phenylenediisocyanate;
2,4-dimethyl-1,3-phenylenediisocyanate;
4,4'-diisocyanatodiphenyl ether;
4,6-dimethyl-1,3-phenylenediisocyanate;
9,10-anthracenediisocyanate;
4,4'-diisocyanatodibenzyl;
3,3'-dimethyl-4,4'-diisocyanatodiphenylmethane;
2,6-dimethyl-4,4'-diisocyanatodiphenyl;
2,4-diisocyanatostilbene;
3,3'-dimethyl-4,4'-diisocyanatodiphenyl;
3,3'-dimethoxy-4,4'-diisocyanatodiphenyl;
1,4-anthracenediisocyanate;
2,5-fluoroenediisocyanate;
1,5-naphthalenediisocyanate;
1,3-phenylenediisocyanate;
Methylene-bis(4-phenylisocyanate);
2,6-diisocyanatobenzylfuran;
Bis(2-isocyanatoethyl)fumarate;
Bis(2-isocyanatoethyl)carbonate; and
Bis(2-isocyanatoethyl)-4-cyclohexene-1,2-dicarboxylate.

Representative aliphatic diisocyanates or higher polyisocyanates which should be useful in the present invention include, among other:
1,4-tetramethylenediisocyanate;
1,6-hexamethylenediisocyanate;
1,1-decamethylenediisocyanate;
1,3-cyclohexylenediisocyanate;
4,4-methylene-bis(cyclohexylisocyanate); and
tetramethylenexylene diisocyanate (TMXDI).

The term aliphatic polyisocyanate as used herein includes any organic polyisocyanate in which the isocyanato groups are attached to saturated carbon atoms. Cycloaliphatic polyisocyanates and polyisocyanates containing aromatic rings such as xylylene diisocyanate can be used provided they meet the limitation stated above. Representative aliphatic polyisocyanates which should be useful include 2,2,4-trimethyl-1,6-hexamethylene diisocyanate; m- and p-xylylene diisocyanate; 3-isocyanatomethyl-3,5,5-trimethylcyclohexyl isocyanate; phenylene bis(2-ethyl isocyanate); 4-methyl-1,3 cyclohexylene diisocyanate; 2-methyl-1,3-cyclohexylene diisocyanate; 4,4'-methylene bis(cyclohexyl isocyanate) and 2,4'-methylene bis(cyclohexyl isocyanate). In addition, aliphatic diisocyanates which contain ester linkages should be useful. Illustrative of such isocyanates are bis(2-isocyanatoethyl)carbonate; bis(2-isocyanatoethyl)fumarate; bis(2-isocyanatoethyl)-4-cyclohexene-1,2-dicarboxylate and lower alkyl esters of 2,5-diisocyanatovaleric acid. Polyisocyanates containing three or more isocyanato groups per molecule such as 2,4-bis(4-isocyanatocyclohexylmethyl)cyclohexyl isocyanate should also be useful. These polyisocyanates can be blended or reacted providing materials applicable to the invention as long as the average functionality remains 2.2 or less and the product is thermoplastic.

Examples of commercial materials of this type are Dow Chemical Co.'s ISONATE 143L ® ("modified" MDI). Preferably the amount of isocyanate(s) used is the stoichiometric amount based on the active hydrogen content of all the ingredients in the formulation.

Isocyanate-terminated polyurethane prepolymers which should be useful herein may include blocked isocyanate prepolymers. Typical blocking agents to react with free isocyanate groups are epsilon caprolactam, methyl ethyl ketoxime, phenol, branched alcohols such as t-butyl alcohol, isopropanol, etc. These deblock at the elevated temperatures used in the present invention to form the thermoplastic polymer alloy of the present invention. Also, a polyalkylene glycol or polyalkylene ether polyester, polyacetal, polyamide, polyester polyamide or polythioether polyol may be reacted with an excess of a polyisocyanate such as those mentioned above to form a suitable prepolymer with residual isocyanate groups.

Such prepolymers are formed in a conventional manner.

Certain polyisocyanates useful in the present invention and those not useful in the present invention (due to too high a functionality or resulting in an initially thermosetting material) are set forth below.

| ISOCYANATE | FUNCTIONALITY | EQUIVALENT WEIGHT | COMMENT |
| --- | --- | --- | --- |
| Rubinate | 2.7 | | Thermosetting |
| XI-128 | 2.1 | 135.48 | Useful, but two high a temperature required |
| XI-209 | 2.15 | 155.35 | Thermoplastic, melts about 270° C. |
| XI-744 | 2.0 | 187 | Thermoplastic |
| XI-192 | 2.2 | 153 | Thermosetting |
| LF-179 | 2.0 | 182 | Thermoplastic |
| LF-168 | 2.1 | 143 | Thermoplastic |
| Mondur PF | 2.0 | 188 | Thermoplastic |
| Mondur M | 2.0 | 125 | Thermoplastic |
| Mondur MR | 2.7 | 133.3 | Thermosetting |
| MF-177 | 2.3 | 135 | Thermosetting |
| Rubinate 44 | 2.0 | 125 | Thermoplastic |

In the present invention, it is possible to use a relatively high molecular weight substantially linear polyhydroxyl compound and/or a chain extending agent as later defined. It should be clearly noted while the single use of each component is contemplated, as an option the dual use of both components is also contemplated.

The relatively high molecular weight substantially linear polyhydroxyl compound(s) can be in a performed polyisocyanate or a polyurethane prepolymer.

Again, the nature of this particular component of the present invention is not particularly limited.

Examples of suitable relatively high molecular weight substantially linear polyhydroxyl compounds with terminal hydroxyl groups of the formula HO-D-HO include polyesters, polyester amides, polyethers, polyacetals, polycarbonates or poly-N-alkylurethanes, other groups such as ester, ether, amide, urethane, or N-alkylurethane groups optionally being present in the above compounds. The molecular weight thereof is preferably more than 500 to 5000, most preferably from 800 to 3000 (number average). The compounds preferably have a melting point below 150° C., in particular, below 110° C. It is also possible to use mixtures of these relatively high molecular weight polyhydroxyl compounds.

The following should be particularly useful: polyesters of adipic acid and dialcohols, if desired, mixtures of dialcohols, for example ethylene glycol; propylene glycol; 1,4-butanediol; 2,5-hexanediol; 2,2-dimethyl-1,3-propanediol; 1,6-hexanediol; 2-ethyl-1,6-hexanediol; 2,2-dimethyl-1,3-hexanediol; p-bishydroxylmethylcyclohexane; 3-methyl-1,4-pentanediol; and 2,2-diethyl-1,3-propanediol; more preferably mixtures of these with diols or mixtures of diols containing 5 or more carbon atoms, because polyesters of this kind show a very high resistance to hydrolysis. When the diols contain branched alkyl radicals, the polyesters also show outstanding low temperature elasticity in the end products. Polyesters obtained by polymerizing caprolactones with glycols should also be suitable starting materials.

Other glycols such as hydrogenated bis-phenol A; cyclohexane dimethanol; caprolactone diol (i.e., the reaction product of caprolactone and ethylene glycol); hydroxyalkylated bisphenols; polyether glycols, e.g., poly(oxytetramethylene) glycol and the like should be useful.

Other useful hydroxy terminated polyols should include polyesters such as polyethylene glycol adipates; polyethylene butylene adipates the corresponding azelates for these two materials; polycaprolactones; polycarbonates; polyethers; polybutadienes or copolymers with acrylonitrile; styrene; etc.

These diols or polyols and blends thereof should have utility in this invention if their average functionality is 2.2 or below.

A further component is a chain extending agent, typically relatively low molecular weight diol(s). As indicated, this can be used instead of the relatively high molecular weight substantially linear polyhydroxyl compound or in addition thereto.

Chain extending agents are compounds which carry, per molecule, at least two active hydrogen atoms and preferably have a molecular weight of from about 52 to less than 500, most preferably from about 62 to about 250 (number average). These compounds react with the isocyanate groups of the prepolymer and build up high molecular weight polyurethane and polyurethane ureas by linking several isocyanate prepolymer molecules.

The following compounds are examples of what we expect to be useful chain extending agents:
ethylene glycol;
propane-1:2-diol;
butane-1:4-diol;
hexane-1:6-diol;
2(3)-methylhexane-1:6-diol;
hydroquinone-bis-hydroxyethyl ether; and
naphthylene-1:5-bis-hydroxyethyl ether;

While not to be construed as limitative, it is most preferred that the NCO/OH ratio in the reaction system of the present invention be on the order of about 0.8 to about 1.1; at values substantially in excess of 1.1, the initial reaction product tends to be non-thermoplastic.

As will be appreciated by one skilled in the art, given the function of the polyol and the diol, the molecular weight of the polyol will generally be greater than that of the diol.

The last mandatory component of the thermoplastic polymer alloys of the present invention is an epoxy resin.

The precise nature of the epoxy resin is not overly important so long as it contains sufficient hydroxyl groups to react with isocyanate groups to provide a curable, non-gelled thermoplastic polymer alloy product.

As will be seen from the later discussion, however, the precise epoxy resin used does play an important role in defining the mechanical properties of the thermoplastic polymer alloy obtained.

The hydroxyl functionality of the epoxy resin must be less than about 1.8, and most preferably less than about 1.5. If the hydroxyl functionality of the epoxy resin is greater than 2, normally a thermosetting resin would initially result which is not in accordance with the present invention. Typically the hydroxyl functionality of the epoxy resin will be greater than about 0.1.

The equivalent weight of the epoxy resin can vary widely, but most of the epoxy resins we have used have an equivalent weight on the order of about 100 to about 500. As the equivalent weight becomes too low, the hydroxyl functionality of the epoxy resin will be too low and there will be insufficient reaction of the epoxy resin into the final product. On the other hand, as the equivalent weight becomes too high, the hydroxyl functionality of the epoxy resin will be too high, and gelation is likely to result.

With respect to molecular weight, as a general rule, for epichlorohydrin bisphenol as the molecular weight is increased the number of hydroxyl groups in the epoxy resin molecule increases. Molecular weight is not overly important, rather, what is important is the number of hydroxyl groups in the epoxy resin. Assuming a direct correlation between molecular weight and the number of hydroxyl groups, if the number of hydroxyl groups becomes too great cross-linking or gelation could occur during the preparation of the thermoplastic polymer alloy. This should be avoided.

It has been found, however, that certain solid epoxy resins do not provide a thermoplastic polymer alloy useful in the present invention.

Illustrative epoxy resins which can be used in the present invention include bisphenol epoxy resins. aliphatic epoxy resins, novolac epoxy resins, brominated epoxy resins, isocyanurate epoxy resins, etc., so long as, of course, the epoxy resin contains the proper number of hydroxyl groups.

Epoxy resins found to be useful in the present invention include the following. Epon (a trademark of Shell Chemical Co.), DER (a trademark of Dow Chemical Co.), Araldite (a trademark of CIBA GEIGY Co.), and Epi-Rez (a trademark of Hoechst-Celanese Corporation).

Where available, the equivalent weight and the hydroxyl equivalent value is given (n value). In the following, equivalent weight is abbreviated eq. wt. and viscosity is abbreviated vis.

Useful aliphatic epoxy resins include DER 732. eq. wt. 305–335, vis. (25° C.) 55–200 cps and DER 736, eq. wt. 175–205, vis. (25° C.) 30–60 cps;

Useful novolac epoxy resins include DER 431, eq. wt. 172–179, vis. (52° C.) 1100–1700 cps. DER 438, eq. wt. 176–181, vis. (52° C.) 20,000–50,000 cps. and DER 439, eq wt 191–210, melting point 48°–58° C.;

Useful bisphenol epoxy resins include Epon 826, eq. wt. 182, n=0.08, Epon 828 eq. wt. 188.5 n=0.13, Epon 830, eq. wt. 194, n=0.17, DER 337 eq. wt. 240, n=0.49, Epon 834, eq. wt. 255, n=0.60, Epon 836, eq. wt. 312.5, n=1.00, Epon 8132, eq. wt. 205, n=0.25, Araldite 6060, eq. wt. 402, n=1.92 and Araldite GT 7071, eq. wt. 490, n=2.25.

Other useful epoxy resins include Epi-Rez 5048, eq. wt. 155, an aliphatic triglycidal ether epoxy resin, Epi-Rez 5063, a halogenated epoxy resin, eq. wt. 280, Epi-Rez 5014, the glycidyl ether of para-tertiary butylphenyl epoxy resin, eq. wt. 220, Epi-Rez 2.5, which has a polyfunctional polymeric structure. eq. wt. 190, Araldite CY 8043, eq. wt. 217, vis. (25° C.) 3000–4500 cps, a brominated epoxy resin. Araldite 0510, eq. wt. 101, vis. (25° C.) 530–850 cps, and Araldite PT 810, eq. wt. 101–111, melting point 85°–111° C., and an isocyanurate-containing epoxy resin.

As would expected, the exact epoxy resin selected does affect the mechanical properties of the thermoplastic polymer alloy obtained.

The amount of epoxy resin used per the present invention can be defined by the range of about 0.5 to about 20, more preferably about 0.5 to 7.0 per the following formula:

$$\frac{A + B + C}{D} = \text{ca. 0.5 to ca. 20}$$

Where
A = long chain polyol(s), and can be zero (0);
B = chain extender(s), and can be zero (0);
C = isocyanates(s) or prepolymer(s)
D = epoxy resin(s); but A and B cannot both be zero (0).

As has been earlier explained, of course, the moieties "A+B" can be replaced totally by A or B or both may be used in combination.

Explaining the formula and illustrating the same in more detail:

A = (equivalent weight of long chain polyol(s)) × (number of equivalents thereof)

B = (equivalent weight of chain extender(s)) × (number of equivalents thereof)

C = (equivalent weight of polyisocyanate(s)) × (number of equivalents thereof)

D = epoxy resin(s) (number of grams thereof).

The equivalents and moles of various raw materials in the novel thermoplastic polyurethane alloy are shown below:

| Raw Materials | Eq. Wt. | Equivalent No. |
|---|---|---|
| Long Chain diol | 1000 | 1 |
| Short Chain diol | 45 | 6 |
| Epoxy resin | 1162 | 0.87 |
| Polyisocyanate | 187 | 7.87 |

The amount of epoxy resin used in the above example can be found in the ranges of about 0.5 to about 20 and about 0.5 to about 7.0 as shown in the following calculation:

$$\frac{(1000 \times 1) + (45 \times 6) + (187 \times 7.87)}{1162} = 2.36$$

The result would be well within the range defined above.

In most instances, this will mean that the epoxy resin will comprise from about 15% to about 75% total composition weight, more preferably, from about 20% to 70% of the total composition weight, and most preferably from about 25% to about 65% of the total composition weight.

The thermoplastic polymer alloys are normally formed by first blending together the long chain linear polyol, the chain extender and the epoxy resin and, if used, any additional ingredients such an additional thermoplastic resin, filler, etc. Conditions of blending are not important and any conventional blending means can be used, though it may be necessary to melt any material to obtain an uniform liquid or to insure a homogeneous system (compatibility). Since we do not use a solvent, we prefer to accomplish this at the lowest possible temperature to avoid premature reaction until the system is well mixed. For a solid, this would be just slightly above the melting point of the solid or until the solid dissolves in the system and stays dissolved. After dissolution of solids, one can cool the system, if desired, though this is not generally necessary. For a liquid which does not dissolve in the other components, this would be the temperature at which the liquid dissolves and stays dissolved.

Having formed the basic ingredients, the polyisocyanate is then generally added slowly with agitation. There is no special criticality to the conditions used for polyisocyanate addition, but normally we prefer to use the lowest possible temperature to avoid premature reaction until the system is well mixed. Constant agitation is preferred to avoid localized pockets of materials which are not blended into a homogeneous system and, if reaction is occurring, one obviously wishes to avoid "hot spots" in the reaction system.

The components of the reaction system of the present invention can obviously be added in any order desired. In the working Examples which are later presented, the polyisocyanate is added last, however.

Obviously additives as are commonly added to "polyurethane products" such as antioxidants, UV stabilizers, colorants, fillers, etc., can be added to the thermoplastic polymer alloy of the present invention in conventional amounts.

Conventional fillers for use herein include, for example, aluminum silicate, calcium silicate, magnesium silicate, calcium carbonate, barium sulfate, calcium sulfate, glass fibers, carbon black and silica. The filler, if used, is normally present in an amount ranging from about 5 to 50% by weight of final resin solids.

The above listing of fillers is not, of course, in any fashion limitative.

The main purposes of using a filler would be as a reinforcing agent, to influence rheological properties, and to lower cost. It is further preferred that the fillers be free from water.

If desired, the thermoplastic polymer alloy of the present invention can be foamed. Many alternatives will be apparent to one skilled in the art. For example, a gaseous material such as nitrogen, etc., can be introduced into the liquid hot melt while the same is under pressure and, when the pressure is removed, the gaseous material will result in a foamed hot melt material. As an alternative, a chemical blowing agent which decomposes at the temperature of use with the liberation of gases. e.g., $CO_2$, $N_2$, etc., could be added to the hot-melt material after production.

In use, the thermoplastic polymer alloy can be cured using a curing agent.

It is not necessary to practice at below or above atmospheric pressure, and conventionally curing of the thermoplastic polymer alloy is typically at atmospheric pressure.

In a similar fashion, it is not necessary to use any protective atmosphere to effect curing.

A chemical curing agent is used to cure the epoxy resin(s) present in the thermoplastic polymer alloy. For example, polyamide, anhydride, complex curing agents, Lewis acids, mercaptans and other conventional curing agents for epoxy resins can be used.

Examples include polysebacic polyanhydride, nadic methyl anhydride, and the following products available from CIBA GEIGY Co.: HT 939 (a polyamide type curing agent), the curing temperature being about 120° C.; HY 920 (a liquid non-aromatic anhydride), the curing temperature being about 170° C.; and DY 9577, an amine complex, the curing temperature being about 170° C.

The curing temperature selected is based primarily upon the activation temperature of the curing agent, and so long as the curing agent is activated and the thermoplastic polymer alloy is not degraded, the curing temperature can be freely selected.

Typically, curing temperatures will be from about room temperature to about 150° C., though higher temperatures can be used. Generally we cure at below 150° C. The curing temperature depends upon the activation temperature of the curing agent, i.e., is sufficient to activate the curing agent, and will be readily apparent skilled in the art. Typically, the manufacturer provides a recommended curing temperature, and we follow the manufacturer's recommendation.

The amount of curing agent used depends upon the type of curing agent and the epoxy value and can easily be determined by one skilled in the art based on the weight of the epoxy resin(s) in the thermoplastic polymer alloy. Thus, the amount of the curing agent is stoichiometric or greater based on the epoxy functionality in the thermoplastic polymer alloy. It is to be noted that the hydroxyl group in the epoxy resin has earlier been reacted with the polyisocyanate, not the epoxy group, which is free for the curing reaction.

While if the thermoplastic polymer alloy is to be used in cured or thermoset form a curing agent is mandatory, the thermoplastic polymer alloy of the present invention can be used in non-cured form. If used in non-cured form, utilities contemplated are as a modifier for polyvinyl chloride resins (acid scavenger), as a blending agent for use with various thermoplastic resins to toughen the same (impact modifier) or as a stabilizer to prevent the thermo decomposition of polyvinyl chloride.

The thermoplastic polymer alloys of the present invention exhibit excellent tensile strength. excellent modulus at 100% and 300% elongation, excellent elongation and an excellent Shore A Hardness.

They find particular use as a hot melt adhesive composition since they can be applied in the thermoplastic state and then cured using a curing agent as above explained to yield a thermoset composition. The thermoplastic polymer alloy of the present invention can be used in any application where hot melt compositions are typically used, but due to its unique properties, the thermoplastic polymer alloys of the present invention find particular application as curable hot melt adhesives, as an elastomer (either cured or uncured), in foams, in coatings, etc.

The thermoplastic polymer alloys of the present invention should also find particular application in powder coating techniques and, in cured form, should be extremely useful to form belts, rollers and hoses for use in industrial applications.

Having thus described in general the procedure used for the Examples, the following non-limiting Examples which illustrate what we currently believe to be the best modes of practicing the invention are given.

GENERAL EXAMPLE PROCEDURE

In all examples, the following abbreviations are used:

DY 9577 is a $BCl_3$ aliphatic-amine complex available from CIBA GEIGY Co.

Terathane 2900 is poly(oxytetramethylene) glycol having a molecular weight of 2900 available from E. I. duPont deNemours & Co.

Tone 0260 is poly(caprolactone) glycol with a molecular weight of 3000 available from Union Carbide Co.

XP-744 is a modified liquid methylene diisocyanate adduct of a functionality of 2.0 and an equivalent weight of 187.

$H_{12}MDI$ is 4,4'-methylene bis(cyclohexyl) isocyanate.

Both of the last two compounds are available from Mobay Chemical Co.

Vorite 1731 is a Desmodur W prepolymer available from Cass Chemical.

Brominated 8043 is a typical brominated epoxy resin.

All epoxy resins have been earlier identified.

In each examples the chain extender was 1,4-butanediol, unless otherwise indicated.

In each example the substantially linear polyhdroxyl compound/1,4-butanediol/polyisocyanate were used at an equivalent weight ratio of 1/6/7. unless otherwise indicated.

The amount of epoxy is based on the total weight of the polyurethane (the reaction product of the linear polyhydroxyl compound, the chain extender and the polyisocyanate).

In each example, the substantially linear polyhydroxyl compound, the chain extender and the epoxy resin were first blended to form a homogenous composition at a temperature of about 50° C. A conventional blending means was used, e.g., any type of stirrer.

The time for blending was not important, but was typically on the order of about 10 to about 15 minutes.

After the first two or three components yield a homogenous composition, the polyisocyanate was added and the resulting system again blended to form a homogenous composition.

The time of adding the components and blending is not important: the key is to obtain a liquid composition. During the blending of the components, we generally prefer to avoid any premature reaction, rather, reaction should occur after a liquid homogenous composition is formed and reaction accomplished by the later described temperature elevation.

After the polyisocyanate was added the temperature was increased from 50° C. to about 180° C., and blending was continued for 3 hours to obtain the thermoplastic polymer alloy of the present invention. Usually we blend (react in) at about 160° C. to about 230° C. for about two hours or more, e.g., about two to three hours at about 160° C. to about 230° C. Temperature appears, to date, to be more important than time, to insure reaction of the hydroxyl groups of the epoxy resin with the urethane component. Maximum time is more a matter of processing convenience than criticality at the conditions given, though excessive times lead to process inefficiency, as will be apparent to one skilled in the art. The lack of free NCO groups is a reliable way to check for complete reaction in of the epoxy hydroxyl functionality.

For reasons which will be apparent to one skilled in the art, since we are using a solvent-free system, we avoid a temperature of reaction which is above the boiling point of any material being used. Usually, the chain extender (such as 1,4-butanediol) will be the material with the lowest boiling point, and that will mandate the maximum reaction temperature.

The thermoplastic polymer alloy was then removed from the blending apparatus in a conventional manner.

Tensile strength in (PSI) was determined using the ASTM method D-412. This is abbreviated TS.

The modulus at 100% elongation and 300% elongation in PSI were determined using ASTM method D-412. These are abbreviated M100 and M300, respectively.

The elongation was determined using the ASTM method D-412. It is abbreviated E.

The EXAMPLE systems can be summarized as follows where, for ease of presenting the summary. (A)=substantially linear polyhydroxyl compound: (B)=chain extender: (C)=the polyisocyanate: and (D)=the curing agent. Further. Tone=Tone 0260. Ter.=Terathene 2900. 1,4BD- 1,4-butanediol.

The epoxy resin(s) used is/are given in each EXAMPLE.

| EXAMPLE | (A) | (B) | (C) | (D) |
|---|---|---|---|---|
| 1 | Tone | 1,4BD | XP-744 | None |
| 2 | Tone | " | " | " |
| 3 | Tone | " | " | See EXAMPLE |
| 4 | Tone or Ter. | " | " | None |
| 5 | Tone | " | XP-744 or H$_{12}$MDI | " |
| 6 | None | " | Vorite 1731 | " |
| 7 | Tone | " | IPDI | DY 9577 |
| 8 | Tone | " | IPDI | " |
| 9 | Tone | " | XP-744 | " |

EXAMPLE 1

This Example shows the effect of different types of epoxy resins on the properties of the alloy obtained.

| Epoxy Type | Epoxy (%)* | Eq. Wt. of Epoxy | TS (psi) | M100 (psi) | M300 (psi) | E (%) |
|---|---|---|---|---|---|---|
| Aliphatic DER 732 | 39 | 305–335 | 320 | — | — | 50 |
| Brominated 8043 | 39 | 217 | 246 | 210 | — | 320 |
| Bisphenol EPON | | | | | | |
| 826 | 39 | 182 | 327 | 233 | — | 330 |
| 828 | 39 | 188.5 | 667 | 338 | — | 700 |
| 830 | 39 | 194 | 724 | 304 | — | 650 |
| 834 | 39 | 255 | 427 | 394 | — | 350 |
| 8132 | 39 | 205 | 366 | 294 | — | 275 |
| DER 337 | 39 | 240 | 271 | 215 | — | 290 |
| Epi-Rez 5014 | 39 | 220 | 726 | 358 | — | 540 |

*Based on the total weight of the urethane component; hereafter the same, unless otherwise indicated.

EXAMPLE 2

This Example illustrates the effect of the equivalent weight of the epoxy resin on the mechanical properties of the thermoplastic polymer alloy obtained.

| Epoxy Type | Epoxy (%) | Eq. Wt. of Epoxy | TS (psi) | M100 (psi) | M300 (psi) | E (%) |
|---|---|---|---|---|---|---|
| EPON | | | | | | |
| 826 | 39 | 182 | 327 | 233 | — | 330 |
| 828 | 39 | 189 | 667 | 338 | — | 700 |
| 830 | 39 | 194 | 724 | 604 | — | 650 |
| DER 337 | 39 | 240 | 271 | 215 | — | 290 |
| EPON 834 | 39 | 255 | 426 | 394 | — | 350 |

EXAMPLE 3

An attractive characteristic of the novel thermoplastic polyurethane alloys of the present invention which comprise reactive epoxy groups is their ability to be cured by conventional curing agents for epoxy resins. As a result, the mechanical properties of the thermoplastic polymer alloy is increased as shown in the following Table.

Effect of Various Curing Agents on the Mechanical Properties of Polyurethane Alloy[1]

| Sample No. | Curing Agent Type. | % | Tensile Strength (psi) | Modulus at 100% (psi) | Modulus at 300% (psi) | Elong. (%) |
|---|---|---|---|---|---|---|
| 1 | None | — | 608 | 139 | 229 | 780 |
| 2 | Versamide 115 | 25[2] | 913 | 661 | — | 120 |
| 3 | DY9577 | 6[3] | 2741 | 1870 | — | 170 |

-continued

Effect of Various Curing Agents on the Mechanical Properties of Polyurethane Alloy[1]

| Sample No. | Curing Agent Type, | % | Tensile Strength (psi) | Modulus at 100% (psi) | Modulus at 300% (psi) | Elong. (%) |
|---|---|---|---|---|---|---|
| 4 | HT939 | 30[3] | 1491 | 494 | 1199 | 420 |

[1]The composition had a polyol/1,4-butanediol/XP744 ratio of 1/6/7 as equivalent weight and the epoxy represented 39 wt. % based on the total weight of the polyurethane
[2]Calculation was based on the epoxy value and the amine value.
[3]Based on the total weight of the epoxy resin. Always same basis, unless otherwise indicated.

EXAMPLE 4

This Example illustrates the effect of different substantially linear polyhydroxyl compounds and epoxy resins on the mechanical properties of the polymer alloy obtained.

| Polyol Type | Epoxy Type | Epoxy % | TS (psi) | M100 (psi) | M300 (psi) | E (%) |
|---|---|---|---|---|---|---|
| TONE 0260 | EPON 828 | 39 | 667 | 338 | — | 700 |
| Terathane 2900 | EPON 828 | 39 | 155 | — | — | 100 |
| TONE 0260 | EPON 830 | 39 | 724 | 304 | — | 650 |
| Terathane 2900 | EPON 830 | 39 | 386 | 227 | — | 370 |
| TONE 0260 | EPON 8132 | 39 | 366 | 294 | — | 270 |
| Terathane 2900 | EPON 8132 | 39 | 300 | 278 | — | 110 |
| TONE 0260 | EPON 834 | 39 | 428 | 394 | — | 350 |
| Terathane 2900 | EPON 834 | 39 | 306 | 290 | — | 210 |

EXAMPLE 5

This Example illustrates the effect of different diisocyanate and epoxy resins on the mechanical properties of polymer alloy obtained.

| Diisocyanate Type | Epoxy Type | Epoxy % | TS (psi) | M100 (psi) | M300 (psi) | E (%) |
|---|---|---|---|---|---|---|
| XP 744 | EPON 826 | 39 | 327 | 233 | — | 330 |
| H$_{12}$MDI | EPON 826 | 39 | 803 | 461 | — | 400 |
| XP 744 | EPON 828 | 39 | 667 | 338 | — | 700 |
| H$_{12}$MDI | EPON 828 | 39 | 510 | 425 | — | 200 |
| XP 744 | EPON 830 | 39 | 724 | 304 | — | 650 |
| H$_{12}$MDI | EPON 830 | 39 | 535 | 401 | — | 240 |
| XP 744 | EPON 8132 | 39 | 366 | 294 | — | 270 |
| H$_{12}$MDI | EPON 8132 | 39 | 704 | 512 | — | 250 |
| XP 744 | DER 337 | 39 | 271 | 215 | — | 290 |
| H$_{12}$MDI | DER 337 | 39 | 355 | 319 | — | 370 |
| XP 744 | EPON 834 | 39 | 428 | 394 | — | 350 |
| H$_{12}$MDI | EPON 834 | 39 | 1038 | 571 | — | 560 |

EXAMPLE 6

When the long chain diol was omitted from the formulation, the final product could be ground into a fine, free-flowing powder. This powder could be used to prepare a hot melt reactive powder coating and adhesive for extensive application in the automotive and electrical industries.

The materials in the following formulation were mixed together at room temperature (25° C.) until an uniform mixture was formed. Reaction was then carried out at 220°-230° C. for three hours at ambient pressure.

| Materials | A | B | C |
|---|---|---|---|
| Vorite 1731 | 170 | 170 | 170 |
| 1,4-Butanediol | 45 | 45 | 45 |
| Epon 828 | 430 | 110 | 45 |
| Epoxy, % | 67 | 33.8 | 17.33 |
| Softening point of product, °C. | n.m. | 111 | 118 |
| Viscosity of product cps/C° | n.m. | 4000/n.m. | 5200/n.m. | n.m. = not measured

The following Examples 7, 8 and 9 are offered to show the impact of a curing agent on the products of the resent invention.

Unless otherwise indicated, the epoxy resin was Epon 828, a bisphenol epoxy resin having an equivalent weight of 188.5 and a hydroxyl equivalent value (n value) of 0.13, available from Shell Chemical Co. The polyisocyanate material used was isophorone diisocyanate (abbreviated IPDI).

Conditions were as earlier indicated unless changed in the individual Example.

EXAMPLE 7

This example illustrates the effect of different curing temperatures and the presence or absence of a curing agent on the hardness of the thermoplastic polymer alloy of the present invention.

Following the procedure earlier indicated, except that the curing agent was blended into the thermoplastic polymer alloy of the present invention at room temperature, the composition of the thermoplastic polymer alloy was Tone 0260,1,4-butane diol. IPDI and Epon 828.

The first three components were present at an equivalent weight of 1/3/4, respectively, and the amount of the epoxy resin was 39 wt. % based on the total weight of the urethane component.

The curing agent DY 9577, when used, was used in an amount of 10 wt. % based on the weight of the epoxy resin.

When cured at 120° C. for 30 minutes, the system without the curing agent gave a Shore A Hardness of 80; an identical value was obtained upon curing at 185° C. for 30 minutes.

Using 10% of the curing agent, curing at 120° C. for 30 minutes gave a Shore A Hardness value of 80 whereas curing at 185° C. for 30 minutes gave a Shore A Hardness of 100.

EXAMPLE 8

This example indicates the effect of the curing agent on the Lap Shear Strength of the thermoplastic polymer alloy of the present invention.

The thermoplastic polymer alloy was formed in the same manner as in Example 7 using the same materials and the same proportions.

However, curing was at 180° C. for 30 minutes.

When no curing agent was used, the Lap Shear Strength, psi, steel/steel was 738; on the other hand, 10 wt. % of the curing agent DY 9577 provided a Lap Shear Strength, psi, steel/steel, of greater than 2000.

The excellent adhesion obtained indicates that the thermoplastic polymer alloy which was cured would serve as an excellent structural adhesive.

EXAMPLE 9

This example somewhat differs from the earlier examples in illustrating the effect of different mixing methods and the presence or absence of the curing agent on the properties of the thermoplastic polymer alloy of the present invention.

In all runs the system was Tone 0260 and, 1,4-butane diol but instead of IPDI, XP-744 was used, the composition of which has been earlier identified. Again, Epon 828 was used. However, the first three components were used at an equivalent weight ratio of 1/6/7, respectively, the epoxy again being used in an amount of 39 wt. % based on the total weight of the urethane component. The curing agent was DY-9577 and it was either absent or used in an amount of 10 wt. % based the weight of the epoxy resin.

In a first set of runs, the compositions were blended in a conventional rubber mill at room temperature.

In a second set of runs, the compositions were blended in a heatable blender, specifically a heated extruder, with blending being at 80° C. for 30 minutes.

The results are set forth in the following table.

| Mixing Method | Curing Agent | TS psi | M100 psi | M300 psi | E psi |
|---|---|---|---|---|---|
| Rubber Mill | None | 608 | 139 | 229 | 780 |
|  | DY-9577 (10%) | 3306 | 2806 | — | 130 |
| Heatable blender | None | 729 | 242 | 375 | 700 |
|  | DY-9577 (10%) | 5517 | — | — | 90 |

While there has been described what are at present considered to be the preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A thermoplastic polymer alloy comprising the reaction product of at least one polyisocyanate, at least one substantially linear polyhydroxyl compound and/or at least one chain extender, and at least one epoxy resin.

2. The thermoplastic polymer alloy of claim 1, wherein said at least one polyisocyanate has a functionality of 2.2 or less, 3. The thermoplastic polymer alloy of claim 1, wherein said at least one polyisocyanate has a functionality of 2.15 or less.

4. The thermoplastic polymer alloy of claim 2, wherein said at least one epoxy resin has a hydroxyl functionality of less than about 1.8.

5. The thermoplastic polymer alloy of claim 3, wherein said at least one epoxy resin has a hydroxyl functionality of less than about 1.5.

6. The thermoplastic polymer alloy of claim 4, wherein said epoxy resin is selected from the group consisting of bisphenol epoxy resins, aliphatic epoxy resins, novolac epoxy resins, brominated epoxy resins, and isocyanurate epoxy resins.

7. The thermoplastic polymer alloy of claim 5, wherein said epoxy resin is selected from the group consisting of bisphenol epoxy resins, aliphatic epoxy resins, novolac epoxy resins brominated epoxy resins, and isocyanurate epoxy resins.

8. The thermoplastic polymer alloy of claim 4, wherein the amount of epoxy resin is defined by the range of about 0.5 to 7.0 per the following formula:

$$\frac{A + B + C}{D} = \text{about } 0.5 \text{ to } 7.0.$$

where A is the equivalent weight of the long chain polyol(s) times the number of equivalents thereof, B is the equivalent weight of the chain extender(s) times the number of equivalents thereof, C is the equivalent weight of the polyisocyanate(s) times the number of equivalents thereof, and D is the number of grams of the epoxy resin(s), where A or B can be zero, but A and B cannot both be zero.

9. The thermoplastic polymer alloy of claim 5, wherein the amount of epoxy resin is defined by the range of about 0.5 to 7.0 per the following formula;

$$\frac{A + B + C}{D} = \text{about } 0.5 \text{ to } 7.0,$$

where A is the equivalent weight of the long chain polyol(s) times the number of equivalents thereof, B is the equivalent weight of the chain extender(s) times the number of equivalents thereof, C is the equivalent weight of the polyisocyanate(s) times the number of equivalents thereof, and D is the number of grams of the epoxy resin(s), where A or B can be zero, but A and B cannot both be zero.

10. The thermoplastic polymer alloy of claim 8, wherein said at least one substantially linear polyhydroxyl compound has a functionality of equal to or less than 2.2 and said at least one chain extender has a molecular weight of about 52 to less than 500.

11. The thermoplastic polymer alloy of claim 9, wherein said at least one substantially linear polyhydroxyl compound has a functionality of equal to or less than 2.2 and said at least one chain extender has a molecular weight of about 52 to less than 500.

12. The thermoplastic polymer alloy of claim 1 which has been cured with a curing agent to yield a thermoset polymer alloy.

13. The thermoplastic polymer alloy of claim 1, wherein the components of the reaction product are first blended together to form a liquid of homogeneous composition and then reacted at an elevated temperature.

14. The thermoplastic polymer alloy of claim 1, wherein said reaction product is prepared in the absence of a solvent.

* * * * *